(12) United States Patent
Belleville et al.

(10) Patent No.: US 6,180,188 B1
(45) Date of Patent: Jan. 30, 2001

(54) METHOD FOR PREPARING A MULTILAYER OPTICAL MATERIAL WITH CROSSLINKING-DENSIFYING BY ULTRAVIOLET RADIATION

(75) Inventors: Philippe Belleville, Tours; Philippe Prene, Courvry, both of (FR)

(73) Assignee: Commissariat a l'energie Atomique (FR)

( * ) Notice: Under 35 U.S.C. 154(b), the term of this patent shall be extended for 0 days.

(21) Appl. No.: 09/355,744

(22) PCT Filed: Feb. 6, 1998

(86) PCT No.: PCT/FR98/00230

§ 371 Date: Aug. 18, 1999

§ 102(e) Date: Aug. 18, 1999

(87) PCT Pub. No.: WO98/34884

PCT Pub. Date: Aug. 13, 1998

(30) Foreign Application Priority Data

Feb. 10, 1997 (FR) .................................................. 97 01484

(51) Int. Cl.[7] ........................................................ C08J 7/04
(52) U.S. Cl. .................... 427/515; 427/162; 427/299; 427/407.1; 427/419.3; 427/508; 427/558; 427/559; 427/595
(58) Field of Search .................................. 427/162, 299, 427/407.1, 419.3, 508, 515, 558, 559, 595

(56) References Cited

U.S. PATENT DOCUMENTS

| | | |
|---|---|---|
| 2,432,483 | 12/1947 | Miller et al. . |
| 2,432,484 | 12/1947 | Moulton et al. . |
| 2,466,119 | 4/1949 | Moulton et al. . |
| 2,584,905 | 2/1952 | Moulton et al. . |
| 2,768,909 | 10/1956 | Haslam . |
| 3,460,956 | 8/1969 | Dable . |
| 4,271,210 | 6/1981 | Yoldas . |
| 4,272,588 | 6/1981 | Yoldas et al. . |
| 4,328,260 | 5/1982 | Whitehouse . |
| 4,929,278 | 5/1990 | Ashley et al. . |
| 4,966,812 | 10/1990 | Ashley et al. . |
| 5,289,315 | 2/1994 | Makita et al. . |
| 5,476,717 | 12/1995 | Floch . |
| 5,623,375 | 4/1997 | Floch et al. . |
| 5,698,266 | 12/1997 | Floch . |
| 5,858,526 | 1/1999 | Floch et al. . |

FOREIGN PATENT DOCUMENTS

| | | |
|---|---|---|
| 736 411 | 6/1943 | (DE) . |
| 937 913 | 1/1956 | (DE) . |
| 0 492 785 | 1/1992 | (EP) . |
| 0 515 848 | 2/1992 | (EP) . |
| 0 533 030 | 3/1993 | (EP) . |
| 2 680 583 | 2/1993 | (FR) . |
| 2 682 486 | 4/1993 | (FR) . |
| 55-010455 | 1/1980 | (JP) . |

OTHER PUBLICATIONS

Database WPI. Section ch, Week 9346, *Derwent Publications Ltd.*, London, GB; Class E12, AN 93–364968 XP002047221 & JP 05270 864 A (Asahi Glass Co. Ltd), Oct. 19, 1993.

S. Maekawa et al., "Evaluation of $SiO_2$ Thin Films Prepared by Sol–Gel Method Using Photo–Irradiation," *Journal of Non–Crystalline Solids*, 169, (1994), pp. 207–209 (no month available).

R.G. Musket, et al., *Appl. Phys. Lett.*, vol. 52(5), 1988. (no month available).

T. Ohishi, et al., "Synthesis and Properties of Tantalum Oxide Films Prepared by the Sol–Gel Method Using Photo–Irradiation," *Journal of Non–crystalline Solids*, 147, 148, (1992), pp. 493–498. (no month available).

*Patent Abstracts of Japan*, vol. 018, No. 004 (C–1149), Jan. 6, 1994 & JP 05237657 A (Nissha Printing Co. Ltd.), Sep. 24, 1993.

*Patent Abstracts of Japan*, vol. 095, No. 003, Apr. 28, 1995 & JP 06345488 A (Asahi Glass Co. Ltd), Dec. 20, 1994.

*Patent Abstracts of Japan*, vol. 095, No. 006, Jul. 31, 1995 & JP 07 062323 A (Asahi Glass Co. Ltd.), Mar. 7, 1995.

T. J. Rehg et al., "Sol–Gel Derived Tantalum Pentoxide Films as Ultraviolet Antireflective Coating for Silicon," *Applied Optics*, Dec. 15, 1989, vol. 28, N. 24, p. 5 215.

R.E. Van de Leest, "UV Photoannealing of thin Sol–Gel Films," *Applied Surface Science* 86 (1995).

"Colloidal Sol–Gel Optical Coatings," *The American Ceramic Society Bulletin*, vol. 69, No. 7, pp. 1147–1443, 1990,. (no month avail.).

*Primary Examiner*—Bernard Pianalto
(74) *Attorney, Agent, or Firm*—Burns, Doane, Swecker & Mathis, L.L.P.

(57) ABSTRACT

The present invention relates to a method for preparing an optic material by depositing on a substrate at least two layers of inorganic polymeric material, each of these layers containing at least one metal oxide or metalloid oxide, the deposited layers being densified cross-linked by exposure to ultraviolet rays. The invention also concerns the optic material which may be prepared using this method. The optic materials which may be prepared using said method are in particular multilayer materials such as antireflective materials and reflective materials.

31 Claims, No Drawings

METHOD FOR PREPARING A MULTILAYER OPTICAL MATERIAL WITH CROSSLINKING-DENSIFYING BY ULTRAVIOLET RADIATION

DESCRIPTION

The present invention relates to a method for preparing an optic material by depositing on a substrate at least two layers of inorganic polymeric material, each of these layers containing at least one metal oxide or metalloid oxide, the deposited layers being densified cross-linked by exposure to ultraviolet rays.

The invention also concerns the optic material which may be prepared using this method.

The optic materials which may be prepared using said method are in particular multilayer materials such as antireflective materials and reflective materials.

The antireflective and reflective materials are made up of an organic or inorganic substrate, coated with several layers of which some have desired specific optic properties.

More precisely, interference dielectric mirrors comprise a substrate, coated with a dielectric film which reflects one or more desired wavelengths, while nonetheless showing relatively low intrinsic absorption in comparison with metals conventionally used to make mirrors.

Antireflective or reflective materials offer a host of applications.

For example, organic or inorganic substrates, namely plastics and glass substrates in particular, coated with an antireflective film are of special interest in the following areas: ophthalmic products and video, or architectural applications such as glass panels placed outside or inside buildings.

In addition, antireflective materials and interference dielectric mirrors may also be used in high-energy lasers, solar, heat and photovoltaic applications or even in integrated optic systems.

Methods are already known in the prior art with which these antireflective materials or interference dielectric mirrors can be produced. These methods are cited below.

Also, if plastics such as polycarbonates, polyacrylates, polyallylcarbonates and others are of particular interest in the ophthalmic sector, glass substrates are also of interest especially in the area of general optics and in the area of screens, such as visualisation screens.

It is easy to understand that with a loss in reflection rate of approximately 4% for each air-glass interface encountered, the average glass index being 1.5, the overall loss for a complex optic system is sometimes consequential.

Therefore, opticians have long sought to create coatings having optic properties, in particular antireflective films using physical methods for vacuum depositing, grouped under the technological term PVD (Physical Vapor Deposition).

These methods include simple or reactive spraying, simple or reactive evaporation by electronic or ionic heating either aided or unaided, etc . . .

Despite the excellent optic, chemical and mechanical quality of the deposits, these techniques require heavy sophisticated equipment which is costly and the methods are mostly time-consuming. This is especially true when the surface of the components to be treated is extensive. The consequence is that such methods are generally ill-adapted to the production of cheaper series.

For example, only cathode-ray tube screens for the most up-market television sets are currently equipped with antireflective coatings applied using the PVD technique.

This is why gentle chemical depositing methods, in particular sol-gel depositing methods, appear to offer an alternative of interest to physical methods of vacuum depositing.

With the sol-gel depositing method it is possible to prepare films deposited on substrates having various optic properties. Said method, compared with conventional methods of vacuum depositing, offers a certain number of advantages among which particular mention may be given to deposition generally conducted at ambient temperature and at atmospheric pressure without the need for a heat stage at very high temperatures, a reduced equipment capital layout, and easy, quick implementation of the method providing great flexibility of use.

The deposition of metal or non-metal oxides having optic properties using the sol-gel method has been given extensive research. It would appear that the sol-gel systems or processes can be grouped into two categories: polymeric processes or systems and colloidal processes or systems.

Each system requires different preparations and operating conditions which are related to the properties of the desired treatment solutions, and to the type of oxide concerned.

The polymeric system consists of using monomer, oligomer or low molecular weight precursors, in solution form and having good molecular homogeneity, which are subsequently converted into an oxide by baking after application on the substrate. The deposited liquid finally changes viscosity as the solvent gradually evaporates until it forms a gel on the substrate. The solid network obtained, still saturated with solvent, is then converted into an oxide by heating the system generally to high temperatures up to 500° C. A dense, hard layer is obtained which adheres strongly to the substrate. The conversion into an oxide is generally accompanied by a heavy loss in mass consisting of water and organic matter, leading to a substantial reduction in the thickness of the layer. This induces strong internal, tensile or compressive stresses within the deposit which may cause glazing of the coating in thick films whether with single or multiple components, that is to say whose thickness is greater than a few $\mu m$.

German patents DE A 736 411 and DE A 937 913 for example, mention the use of hydrolytic compounds to prepare various interference films. The major drawback of these methods lies in the compulsory heat treatment at between 500 and 600° C. to convert the polymeric intermediates into final dense ceramics. These high temperatures restrict the choice of type of substrate to be coated and complicate implementation at industrial level.

Patent U.S. Pat. No. 2,466,119 describes a process for preparing reflective and/or antireflective multilayer films, by hydrolysis and condensation of halide mixtures of titanium and/or silicon alkoxides. Control over the porosity of these layers is made by varying the temperature. However, obtaining layers with good mechanical resistance requires heating to temperatures far greater than the temperature that usual plastics can withstand, whose thermal stability is generally 150° C. at the most.

Patent U.S. Pat. No. 2,584,905 describes the preparation of thin reflective layers from alcohol solutions of $TiCl_4$ and a silicon alkoxide. Here again, it is necessary to have recourse to a high temperature heat treatment stage in order to achieve proper densification of the oxides. In this method, the problems of glazing and flaking related to material densifying considerably reduce the preparation of highly reflective multilayer constructions.

Patent U.S. Pat. No. 3,460,956 describes the preparation of reflective films in TiO2 from hydrolysates of tetralkyl titanates in an alcohol medium. However, for efficient conversion of the polymer film into a dense oxide, the film needs to undergo heating to a high temperature, in the region of 500° C., which is detrimental and penalising for all organic substrates.

Patents U.S. Pat. Nos. 2,768,909 and 2,710,267 describe the production of reflective films in $TiO_2$ from alcohol sols of a titanium alkoxide, these sols able to be hydrolysed by atmospheric humidity. This approach also requires high temperature baking of the condensed intermediates, and the layers obtained are not abrasive resistant.

Patent U.S. Pat. No. 4,272,588 concerns the possibility of increasing the reflectivity of mirrors in noble metals and the possibility of making the latter chemically passive, through the deposition of $TiO_2$ and $Ta_2O_5$ dielectric layers derived from molecular precursors.

Such coatings are obtained by compulsory heating to approximately 400° C.

Therefore the polymeric material generally used for thin optic layers with a high refractive index (lying for example between 1.9 and 2.1) is titanium oxide ($TiO_2$). However, in order to obtain layers with mechanical resistance to abrasion, densification needs to be conducted at a high temperature, close to 400° C., which cannot be taken into consideration for plastic substrates for example.

Document U.S. Pat. No. 4,328,260 describes a process and a composition to apply an antireflective treatment and a grating onto solar cells, which comprises the application of a mask to the surface of the cell, the application of a metal alkoxide paste (Ta, Ti, Nb, Y, Zr, Te) onto the mask, and heating the cell to a temperature of 300° C. to 550° C. to decompose the alkoxide and form the metal oxide.

The remaining surfaces are plated with nickel to a form a metal grating. Application both of an antireflective coating and of a grating means that the problems which arise in this document are basically different to those of the present application, also the temperatures used to obtain the metal oxide are very high and incompatible with a substrate such as an organic substrate; in addition the application of paste on a substrate does not give precise control over the thickness deposited.

Document JP A 55 010455 relates to the preparation of an antireflective coating on a silicon substrate by depositing a mixture of tantalum alkoxide and a complexing agent such as acetic acid and heating to a temperature of 200 to 800° C.

However, said method has the disadvantage that the stability of the alkoxide solutions is very low, they are costly and the temperatures used are not suitable for all substrates.

Patent EP A 0 533 030 relates to a method and equipment for forming a monolayer antireflective coating on a cathode-ray tube by applying an aqueous solution of a metal alkoxide, silicon in particular, and by irradiating this solution with ultraviolet light so as to harden it.

The document by S. MAEKAWA et al. "Evaluation of $SiO_2$ thin films prepared by sol-gel method using photo-irradiation" Journal of Non-Crystalline Solids, 169, (1994), 207–209, relates to the preparation of thin layers in $SiO_2$ using a sol-gel method in which a $SiO_2$ precursor solution, such as a TEOS solution (tetraethosixylane), in a mixture of water, nitric acid and ethanol is deposited on substrates in quartz or silica.

Some substrates undergo heating to 80–200° C. and are subsequently irradiated simultaneously by two types of ultraviolet rays at wavelengths of 184 nm and 254 nm and are then re-heated. This document only describes monolayer coatings, and obtaining thin films that are hard and dense requires two heat treatments in addition to UV treatment.

The document by R. E. Van de LEEST "UV photoannealing of thin sol-gel films" Applied Surface Science 86 (1995) describes the annealing-densification at low temperature (100° C.) of thin polymeric layers obtained using the sol-gel technique with solutions of Ti or Si alkoxides by means of exposure to ultraviolet rays.

The coatings prepared in this manner are solely monolayer.

The document by T. J. REHG et al "Sol gel derived tantalum pentoxide films as ultraviolet antireflective coating for silicon", Applied Optics, 15.12.1989, Vol. 28, N.24, p 5215-, describes a method for preparing antireflective coatings on silicon by deposition of a tantalum pentoxide solution and heat treatment to a temperature of 300 to 1000° C.

The document by T. OHISHI et al "Synthesis and properties of Tantalum oxide films prepared by the sol-gel method using photo-irradiation", Journal of Non-crystalline Solids, 147, 148 (1992) 493–498 describes the preparation of thin dielectric layers in $Ta_2O_5$ from tantalum ethoxide solutions previously irradiated with ultraviolet rays at a wavelength of 254 nm, and exposure of the thin layers at ambient temperature to ultraviolet rays at a wavelength of 184 nm.

The disadvantages of such a method are related to the use of tantalum alkoxide as a precursor, and to the fact that the prepared thin layers are derived from unstable solutions which undergo photo-irradiation.

The other process or system of sol-gel depositing is the colloidal process or system in which dispersions of small particles are used, in particular of oxides or fluorides, either crystallized or amorphous and already chemically formed in solution, having a diameter preferably in the region of a few dozen nanometers for optic applications. The particles are previously prepared using the sol-gel method or hydrothermal synthesis, either by promoting a mechanism of germination-growth followed by stabilizing the system to a desired degree of nucleation, or by precipitation-peptisation in a suitable solvent, to produce colloidal suspensions, these suspensions forming what is termed a "sol".

At the time of deposition, the evaporation of the solvent— the latter being chosen to be sufficiently volatile so as to evaporate easily—causes an increase in the concentration of particles which, in most cases, precipitate on the substrate.

The resulting coating is porous, has no internal stress and is mechanically non-resistant to abrasion.

Examples of embodiment of sol/gel layers made using said method are described in particular in patent application U.S. Pat. No. 7,148,458 (NTIS) corresponding to patents U.S. Pat. No. 4,929,278 and U.S. Pat. No. 4,966,812 in patents U.S. Pat. No. 2,432,483 and U.S. Pat. No. 271,210.

Patent application U.S. Pat. No. 7,148,458 (NTIS) describes a method for depositing an antireflective film on plastic substrates, consisting of synthesising an ethanol gel in the $SiO_2$—$B_2O_3$—$Al_2O_3$—BaO system until a certain molecular complexity is obtained, then re-liquefying this gel by mechanically breaking up some interpolymeric bonds. In this way a porous film is obtained with a low refractive index (approximately 1.23), produced at ambient temperature which allows adaptation to substrates in plastic; however, this film only offers mediocre resistance to abrasion.

American patents U.S. Pat. Nos. 2,432,483 and 4,271,210 disclose the possibility of using silica or alumina colloids to produce antireflective dielectric coatings which enables the porosity of these coatings to be increased and therefore their refractive index to be lowered. While these methods offer the advantage of possibly being implemented at low temperatures, the colloidal layers obtained have very low mechanical resistance and are particularly sensitive to any physical contact.

Also, the article entitled "Colloidal Sol-Gel Optical Coatings" published in "The American Ceramic Society Bulletin", vol. 69, n°7, pp. 1141–1443, 1990, describes a method of depositing thin layers by the sol/gel method using spin coating.

This article specifies that by using sol-gel colloidal suspensions and by making a judicious choice of volatile solvents to form the liquid phase of the colloidal medium, it is possible to conduct treatments at ambient temperature without excessive heating of the substrate. With this technique it is therefore possible to treat thermally fragile materials.

However, the very nature of these colloidal films, that is to say their porosity, implies the low mechanical resistance of these films both in respect of abrasion and of adhesion to the substrate on which they are deposited. Such deposits cannot withstand any physical contact, whether touching or wiping, without being damaged. The only cohesion forces which exist in these colloidal films are of physical adsorption type and no chemical bond exists between the particles and the substrate, or between the particles themselves.

Mechanical resistance can, however, be distinctly improved by adding a binding agent between the particles. This binding agent, a veritable inter-particle chemical "joint", may be of organic, inorganic or hybrid type. It strengthens the mechanical cohesion of the system.

The prior art contains at least three documents which refer to a significant improvement in mechanical resistance of thin optic layers containing colloidal silica ($SiO_2$).

Patent U.S. Pat. No. 2,432,484 discloses the use of a product made up of an alcohol, a catalyst and tetraethylorthosilicate acting as chemical binding agent between the colloidal particles, such as to reinforce the cohesion of the porous construction. This chemical binding agent is applied either to the already deposited colloidal silica layer, or it is incorporated into the treatment medium (namely the colloidal sol) and the assembly is applied in one single treatment. Having regard to the proportion of chemical binding agent used, the porosity of the colloidal deposit may remain virtually unchanged and in this way the optic properties can be maintained. The mechanical resistance of the film reinforced in this manner can withstand touching and wiping. Also additional heat treatment of the coating at low temperature, that is to say in the region of 100° C., can further improve this resistance. However, said deposit remains vulnerable to strong abrasive attack.

From an article published by R. G. MUSKET et al, at the Lawrence Livermore National Library in California, published in Appl. Phys. Lett., vol. 52(5), 1988, a method is known with which to increase the adhesion of the oxide/oxide interface using a beam of ions. The authors describe the treatment of antireflective layers containing colloidal silica by irradiation at 200 keV with He+ helium ions. This treatment brings an improvement in particle adhesion both between themselves and with the substrate, which gives the layer treated in this manner resistance to usual optic cleaning (wiping) without impairing its optic properties. The explanation put forward for this phenomenon is based on surface reactivity of the colloidal particles, which is increased through ion bombarding.

French patent application n° 93 03987 of Apr. 5, 1993 by the CEA describes a method for improving the abrasive resistance of thin layers having antireflective optic properties through the use of alkaline reagents after depositing the film. However, although said method is conducted at ordinary temperature and pressure, the abrasion resistance of such layers is insufficient for "general public" applications.

French patent FR A 2 680 583 by the CEA describes a material having antireflective properties, as well as hydrophobic and abrasion-resistant properties. This material comprises a substrate of organic or inorganic type, coated successively with an adhesion-promoting layer made in a material chosen from among the silanes, an antireflective layer in silica colloids coated with a siloxane binding agent, and a fluoride polymer anti-abrasive layer. However, this material has a spectral transmission range that is typical of a monolayer coating, in the region of 100 nm only, and although its resistance to abrasion is good it does not resist all attack.

French patent application FR 2 682 486 by the CEA reports on the preparation of dielectric mirrors with high resistance to laser flow, using a method conducted at ambient temperature, which allows adaptation to organic substrates. The thin layers having the desired optic properties are prepared from colloidal suspensions, which are deposited by alternating a material with a low refractive index with a material having a high refractive index.

However, the colloidal layers used are porous by nature, which implies a low refractive index compared with the index of a film of the same material in dense form. Consequently, reflectivity being equal, it is necessary to stack a greater number of layers to remedy this difference in index which implies a longer treatment time and consequent weakening of the optic coating.

French patent application FR 93 08762 by the CEA describes the preparation of composite materials having a high refractive index, characterized in that they comprise colloids of metal oxide coated in a polyvinyl polymer, soluble in an alcohol solvent. The organic polymer coating the colloids causes a reduction in the residual open porosity between the oxide particles. This gives rise to an increase in the refractive index of the deposited layer, an increase in the mechanical abrasion-resistance properties in comparison with the corresponding colloid layer since the polymer acts as a binding agent between the particles, and an improvement in resistance to laser flow.

However, the improvement in the mechanical abrasion-resistant properties of the layer obtained requires the use of adhesion-promoting layers or of coupling-agent layers. This leads to longer production time and higher production costs. Also the mechanical abrasion-resistant properties remain insufficient in particular for general public applications, for example for the antireflective treatment of screens, in particular cathode-ray tube screens for television sets or other equipment.

One of the purposes of the invention is therefore to overcome the disadvantages of the prior art cited above and to provide a method for preparing an optic material by depositing on a substrate at least two layers of inorganic polymeric material containing at least one metal oxide or metalloid oxide, which may be implemented at low temperature, preferably at ambient temperature, and on any substrate using simple, low-cost equipment with considerably reduced production time.

The method must also enable optic materials to be obtained which have good mechanical resistance properties, in particular good abrasion resistance, and excellent adhesion firstly between the layers and secondly between the layers and the substrate.

This purpose and others are achieved according to the invention through a method for preparing an optic material by depositing on a substrate at least two layers of inorganic polymeric material containing at least one metal oxide or metalloid oxide characterized in that the layers are deposited from solutions of precursor(s) which have not undergone any photo-irradiation, and in that the deposited layers are densified cross-linked at ambient temperature by exposure to ultraviolet rays.

Since the cross-linking/densification operation is conducted at ambient temperature, the method of the invention is applicable to substrates in plastic material or any other material which cannot withstand high treatment temperatures, also the method may be conducted within a substantially shorter time with much simplified equipment compared with methods involving thermal cross-linking/densification which require numerous means such as a vacuum or controlled atmosphere incubator, rinsing tank etc . . . and which are relatively costly in terms of power-consumption.

Treatment by ultraviolet exposure permits cross-linking of the polymeric network, for example of the metal or metalloid oxyhydroxide of each layer and thus to densify this layer. This treatment gives rise in particular to improved mechanical resistance and an increase in the refractive index compared with an equivalent layer which has not undergone such treatment.

In unexpected manner, the method of the invention accumulates the advantages of both families of the sol-gel method without their drawbacks, in the sense that, similarly to the colloidal systems, it can be implemented at ambient temperature but yields resistant coatings, but unlike the polymeric sol-gel systems said resistance is obtained at low temperature.

Said metal oxide or metalloid oxide is preferably chosen from among tantalum oxide, titanium oxide, yttrium oxide, scandium oxide, zirconium oxide, hafnium oxide, thorium oxide, niobium oxide, lanthanum oxide, aluminium oxide, silicon oxide and magnesium oxide.

According to one particularly advantageous aspect of the invention, in the event that the polymeric material of each layer comprises residual chloride ions (halides), densification by UV exposure also brings an improvement in the wetting properties of the layers containing this material.

According to a first embodiment of the method of the invention, cross-linking/densification is conducted by exposing to ultraviolet rays the assembly (stack) of deposited layers. Said embodiment offers the essential advantage of an extremely reduced overall operation time.

According to a second embodiment of the method of the invention, cross-linking/densification is conducted by exposure of each of the deposited layers to ultraviolet rays after depositing each of the layers of inorganic polymeric material.

Said method of embodiment, owing to the fact that UV densification makes the surfaces wettable just after exposure, ensures good interaction between the layers and improves the mechanical abrasion-resistance of the coating and the time-saving for the entire process is only very slightly less than that obtained with the first embodiment.

With the method of the invention, it is possible to prepare optic materials having any given number of polymeric layers containing a metal oxide or metalloid oxide.

Therefore, with the invention it is possible in particular to prepare an optic material comprising a substrate of organic or inorganic type coated with at least one layer of densified/cross-linked polymeric material containing a metal oxide or metalloid oxide, in particular containing tantalum oxide, having a high refractive index and mechanically abrasion-resistant. Preferably, at least one other deposited layer is chosen in addition from:

a densified/cross-linked polymeric layer containing a metal oxide or metalloid oxide, in particular containing silicon oxide or magnesium oxide, having a low refractive index, a densified/cross-linked polymeric layer containing a metal oxide or metalloid oxide, for example containing tantalum oxide or another metal or metalloid oxide such as silicon oxide, having an average refractive index.

With the invention it is possible in particular to prepare a narrow-band or wide-band antireflective material and a dielectric mirror.

The antireflective material comprises a substrate of organic or inorganic type successively coated with:

a layer of densified/cross-linked polymeric material with a high refractive index, a layer of polymeric material with a low refractive index.

Said material is rather a "narrow-band" antireflective material but which gives extremely high performance and is suitable in particular for eyeglass applications.

If the antireflective material also comprises a layer ("lower layer") having an average refractive index applied to the substrate below the layer having a high refractive index, a so-called "wide-band" antireflective material can be obtained; the difference in band width that exists firstly between a "wide-band" antireflective material and secondly a "narrow-band" antireflective material is approximately 50% or more.

Throughout the disclosure, the terms "low", "average" and "high" refractive indexes must generally be interpreted as denoting that the index is lower than approximately 1.5, between approximately 1.5 and 1.8 and more than approximately 1.8 respectively. While the substrate has an index lying for example between approximately 1.45 and 1.60.

The antireflective material may also, on the low refractive index layer, comprise an antibrasive layer preferably containing a fluoroorganosilane (fluoride silane).

Also, the presence of an anti-abrasive layer according to the invention preferably containing a fluoride silane enables the antireflective properties to be maintained while at the same time significantly increasing resistance to abrasion.

In addition, the layer of fluoride silane confers anti-adhesive and hydrophobic properties on the deposit that is of particular interest since it facilitates cleaning of the treated surface.

The antireflective layers treated in this way using the method of the invention which involves cross-linking/densification at ambient temperature by exposure to ultraviolet rays, are homogeneous and free from any cracks and/or internal delamination. Consequently, the antireflective film obtained is sufficiently elastic to tolerate minor bending or deformation when applied on a plastic substrate. Also, this film resists against humid heat or saline atmospheres and proves to have a good lifetime even after several successive immersions in boiling salt water (10 or more).

When applied to a glass substrate, the wide-band antireflective coating, for example having a bandwidth of 300 nm, centred at 550 nm, prepared using the method of the invention, shows remarkable mechanical resistance properties and may therefore be given general public applications such as applications to cathode-ray tube screens for television sets.

Generally, the antireflective material prepared using the method of the invention meets, in surprising manner, all the requirements for this type of use, namely:

specular reflection of less than 0.8% at 580 nm, reflection of less than 1% between 450 and 700 nm over the entire width of the spectrum, minimum angle-dependent reflection, mechanical resistance defined as resistance to severe abrasion as per standard US MIL C 0675 C characterized by the absence of any impairment after 40 passes.

chemical resistance characterized by resistance to routine maintenance products, acids, bases and organic solvents (ethanol, acetone, etc . . . )

With the method of the invention, it is also possible to prepare a reflective material, comprising an organic or inorganic substrate coated with at least one sequence of two layers comprising a layer having a low refractive index similar to that cited above, a polymeric layer for example containing tantalum oxide with a high refractive index and mechanically resistant to the previously described abrasion;

optionally an anti-abrasive layer.

The reflective material obtained is a passive mono or polychromatic dielectric mirror reflecting wavelengths ranging from near ultraviolet to near infrared which may be prepared using a simple method conducted at ambient temperature.

The reflective material prepared using the method of the invention may also comprise a substrate coated with at least one layer having a low refractive index as already described above, and at least one layer having an "average" refractive index similar to that already described above for antireflective material, preferably formed from a polymeric material containing tantalum oxide and another metal oxide or metalloid oxide, preferably silicon oxide or magnesium oxide.

The material obtained may, in this case, rather be qualified as a "semi-reflective material".

Also, by reversing the order of the layers of antireflective materials described above, it is also possible to obtain reflective or semi-reflective materials.

The invention will be better understood on reading the following description of an embodiment of the invention given as a non-restrictive, illustrative example.

According to the invention, each layer of inorganic polymeric material containing at least one metal oxide or metalloid oxide is generally prepared and deposited in stages consisting of:

preparing a solution (1) in a solvent (3) comprising a molecular compound containing a metal or metalloid, also called a metal or metalloid molecular precursor;

optionally mixing said solution (1) with one or more solutions in a solvent of same type comprising one or more metal or metalloid compounds whose metal or metalloid is different to the metal or metalloid of the of the metal or metalloid compound of solution (1); or adding the said metal or metalloid compound(s) to said solution (1); after which a solution (2) is obtained;

depositing the solution obtained on a support, which support may be made up of the substrate and the layer or stack of layers previously deposited to form a uniform layer of polymeric material.

It is this layer of polymeric material containing at least one metal or metalloid oxide which is submitted to cross-linking/densification at ambient temperature by exposure to ultraviolet rays.

According to one characteristic of particular interest of the method according to the invention, the solutions of precursor(s) used for deposition do not, unlike the prior art, undergo irradiation, in particular photo-irradiation prior to depositing.

Such irradiation, conducted on solutions of precursor(s) and not on the deposited layers leads to strong instability of these solutions and the consequence is a very limited lifetime.

The first stage of the depositing process of each layer therefore consists of synthesising a solution in a solvent containing a metal or metalloid molecular precursor-compound able to form a film or a homogenous polymeric layer of metal or metalloid oxyhydroxide during deposition, by a hydrolysis condensation reaction with the water vapour contained in air.

This solution 1 is obtained by dissolving in a solvent a metal or metalloid precursor compound which may be chosen from any suitable compound, such as a metal or metalloid alkoxide or other salt, such as a halide (Iodide, Fluoride, Bromide, Chloride) in particular a chloride. The solvent(s) is (are) preferably chosen from among the saturated aliphatic alcohols with the formula ROH, in which R is an alkyl group with 1 to 5 carbon atoms.

The metal or metalloid is preferably chosen from among tantalum, titanium, silicon, yttrium, scandium, zirconium, hafnium, thorium, niobium, lanthanum, aluminium and magnesium.

The concentration of the metal or metalloid precursor compound is preferably from 1 to 20%, further preferably from 5 to 10% in mass equivalent of metal or metalloid oxide in the solvent.

For example, in the event that it is desired to deposit a layer with a high refractive index, this metal salt may be a salt of anhydrous tantalum, preferably a tantalum pentahalide $TaX_5$ (where X=F, Br, Cl or I). Solution 1 is preferably obtained by dissolving tantalum pentachloride $TaCl_5$ in a solvent which is preferably absolute ethanol.

This mixture gives rise to the formation, if the halogen is chlorine for example, of a tantalum chloroalkoxide according to the following equilibrium as described by Pascal P., in *Nouveau Traité de Chimie Minérale*, Masson Ed., Paris, Volume XII (1959), p. 576:

$$TaCl_5 + xROH \leftrightarrow TaCl_{5-x}(OR)_x + xHCl$$

For example, x=3, that is to say that the equilibrium will then be as follows:

$$TaCl_5 + 3EtOH \leftrightarrow TaCl_2(OEt)_3 + 3HCl$$

The reaction is slightly exothermal (temperature rise up to approximately 50° C.). The solution (1) obtained after cooling and filtration is limpid, transparent and highly acid.

In this preferred embodiment, in which at least one of the deposited layers, which is rather a layer with a high refractive index, is prepared from said solution of anhydrous tantalum salt (1), the method of the present application offers a still further number of advantages compared with the prior art, in which a metal or metalloid alkoxide is generally used as a precursor, such as a tantalum alkoxide, for example tantalum pentoxide $Ta(Oet)_5$ hydrolysed in an acid HCl or $Ch_3COOH$ medium. Such solutions gel relatively quickly, over approximately 2 to 3 days, and their stability is therefore distinctly reduced in comparison with the chloroalkoxide solutions which are preferably used according to the present invention. Also, alkoxide solutions necessarily require a complexing agent and are also much more costly than the solutions prepared from $TaCl_5$ for example which is easily obtainable and at relatively low cost.

Solution 1, for example tantalum chloroalkoxide in ethanol, also called $TaCl_5$/EtOH solution in the remainder of this disclosure, generally has a concentration of 1 to 20% expressed in $Ta_2O_5$ mass equivalent.

This solution is little sensitive to air humidity. However if water is added to it, for example with a $H_2O$/Ta molar ratio of 10, a gel is rapidly formed. Such solution must, therefore, be stored away from ambient humidity.

Although said solution may be used in fully satisfactory manner, and is distinctly superior to the alkoxide solutions used up until now for the foregoing reasons, the excess of HCl present in the mixture does however give rise to two disadvantages.

Firstly, the acid vapours derived from the solution are corrosive for metal objects. Secondly, the deposited layer contains excess halide ions such as chloride ions which make the surface of the coating relatively non-wettable preventing proper adhesion of the subsequent deposit and they are not eliminated by heat treatment at low temperature.

Preferably it is therefore endeavoured to remove the halide ions, in particular the chloride ions contained in excess in the solution or at least the excess is limited in relation to the metal precursor.

Removal of the excess of hydrochloric acid for example (if X=Cl) may be made by evaporation, that is to say the excess of hydrochloric acid and ethanol is removed from the $TaCl_5$ mixture by evaporation under reduced pressure for example $10^{-2}$ mbar. A white solid is obtained corresponding to $TaCl_2(OEt)_3$, the residue is then partially re-dissolved in ethanol to give a solution of 5 to 10% for example, preferably of 7% in $Ta_2O_5$ mass equivalent. Dissolution is complete after reflux for 4 hours at 80° C. for example. After filtering the mixture a limpid, transparent solution is obtained with a pH close to 2. In the remainder of this disclosure, this solution will be referred to as $TaCl_2(OEt)_3$/EtOH.

The sensitivity of this solution to humidity is close to that of solution $TaCl_5$/EtOH.

It is also possible, as mentioned above, to prepare tantalum solutions (1) using different $TaX_5$ metal salts where X=F, Br, I in addition to Cl dissolved in ethanol, for example at a concentration of 5% to 10% in $Ta_2O_5$ mass equivalent in order to obtain less acid treatment solutions and to overcome wettability problems of the deposited layer, essentially connected with the presence of chlorides.

In all cases, the concentration of the molecular precursor compound of tantalum is preferably 1 to 20%, further preferably from 5 to 10% in tantalum oxide mass equivalent, in the solvent, such as the alcohol solvent.

If it is desired to deposit a layer with a low refractive index, the latter may for example be formed of silicon oxide in polymeric form (polymeric silicon) or magnesium oxide.

The treatment solution used to obtain a thin layer of polymeric silica is preferably obtained by hydrolysis-condensation of tetraethylorthosilicate (TEOS, $Si(OEt)_4$) in an acid HCl or $HNO_3$ medium. This gives rise to the formation of an oligomer species according to the reaction:

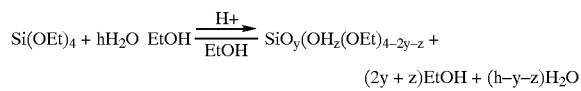

$$Si(OEt)_4 + hH_2O \text{ EtOH} \underset{EtOH}{\overset{H+}{\rightleftharpoons}} SiO_y(OH_z(OEt)_{4-2y-z} +$$
$$(2y + z)EtOH + (h-y-z)H_2O$$

This solution is unstable and changes over time since the hydrolysis and condensation reactions, forming the silicate network, are relatively slow for silicon.

The optic, mechanical and chemical properties of the thin layer of polymeric silica are closely dependent upon these physico-chemical parameters.

As an example, and after optimisation, the following preparative conditions are obtained:

A mother solution of polymeric silica is prepared with 10.6% $SiO_2$ by mass in ethanol, that is to say that h=10 and the pH is approximately 2.

After magnetic stirring for 4 hours and undisturbed maturing at ambient temperature for 3 to 4 weeks, the mother solution is diluted with pure ethanol to approximately 4% by mass (for example to 3.75% by mass) to slow down and stabilize the formation of the silicate network. The solution obtained is limpid and transparent. It remains stable for twelve months at least whereas the mother solution gels after one month.

The thin layers of polymeric silica have a refractive index close to 1.40 at 550 nm before and after cross-linking, for example by baking and UV exposure.

The thin layers of polymeric silica have excellent abrasion-resistance properties and are resistant to usual organic solvents: alcohols, acetone, weak acids and bases (except hydrofluoric acid).

The surface of the polymeric silica layer shows good wetting properties vis-à-vis water and ethanol which are further improved by exposure to ultraviolet in accordance with the invention.

The solution (solution 1) in a solvent can be mixed with a solution in solvent of same type comprising a metal or metalloid precursor compound whose metal or metalloid is different to that of the metal or metalloid compound of solution 1, this precursor compound subsequently giving a compound containing a metal oxide or metalloid oxide, the addition being made in a proportion of 0 to 100% metal or metalloid oxide equivalent per 100 to 0% metal oxide or metalloid oxide equivalent of solution (1).

The metal or metalloid is chosen from among the elements cited above for solution (1) but is different to the metal or metalloid of the precursor compound of solution (1).

It is also possible to add the metal or metalloid compound, whose metal or metalloid is different to that of the precursor compound of solution (1), directly to solution (1) of the metal or metalloid molecular precursor compound in order to directly obtain the desired concentration.

In either case a solution (2) of molecular precursors is obtained preferably having a concentration of 1 to 20%, further preferably of 5 to 10% in metal oxide or metalloid oxide mass equivalent, the proportions of added metal oxide or metalloid oxide equivalent/metal oxide or metalloid oxide of solution (1) varying from 0/100 to 100/0.

For example, if the metal or metalloid molecular precursor compound used for solution (1) is a halide, for example a metal or metalloid chloride such as tantalum pentachloride, it is therefore possible to reduce the proportion of chloride ions (or halides) in relation to the metal precursor in the solution, by adding thereto another metal compound which does not contain chloride ions but nonetheless maintains the optic and mechanical properties of the material after deposition and treatment by cross-linking.

Titanium oxide appears to be an excellent candidate, the abrasion-resistant properties of the material being ensured by tantalum oxide.

Preferably from 1 to 99%, for example 10 to 90%, expressed in oxide mass equivalent, of the metal precursor compound not containing any chloride ions can be used, subsequently yielding titanium oxide for example, but preferably the formulation chosen with which layers can be obtained which meet abrasion resistance and refractive index specifications, corresponds to a final proportion of 50% or less expressed in titanium oxide mass.

To obtain said system, to the $TaCl_5$/EtOH solution is added titanium tetra-isopropoxide $(Ti(Opr^2))_4$ used as a precursor, but it is also possible to use another titanium alkoxide or another precursor compound of titanium oxide; after filtering the mixture a solution (2) is obtained that is limpid and transparent with pH<2.

In the remainder of this disclosure, this solution will be called $TaCl_5$—$Ti(OiPr)_4$/EtOH for example, such solution enabling the deposition of layers having a high refractive index.

Finally, it is also possible to add to solution (1) several solutions comprising several metal or metalloid compounds, or several metal or metalloid compounds, said metals or metalloids being different to the metal or metalloid compound of solution (1).

In this way, it is possible to modulate at will the refractive index of the polymeric layers obtained, while maintaining in particular the mechanical abrasion-resistance properties of these layers.

It is, for example, possible to modulate the refractive index of a polymeric system containing tantalum oxide and silicon oxide in continuous manner between 1.45 and 1.93 by varying the proportion of the mixture constituents.

To modulate the refractive index, it is also possible to use any oxide other than silicon oxide in the proportions given above, by having recourse to a suitable precursor. For example magnesium oxide may be mentioned.

It is also possible to increase the refractive index of a layer, for example a tantalum oxide containing layer, up to a value of 2.04 after densification, by adding to solution (1) a solution containing a precursor, titanium for example, without impairing good mechanical abrasion-resistant properties.

However, use of the $TiO_2$-containing compound should preferably be reserved for uses other than power lasers. For this oxide has an intrinsic absorption of light energy which limits its level of resistance to low value laser flow. This polymeric material ($Ta_2O_5$/$TiO_2$) is ideal, on the other hand, for other applications such as integrated optics for example or semi-reflective layers on plastic since, if it is combined with colloidal silica, it forms a very high refractive index ratio couple of 1.67 for example.

Finally, it is also possible to prepare polymeric layers containing three or more oxides, for example containing tantalum oxide, titanium oxide and silicon oxide, the proportions of the three (or more) constituents varying over the whole range of possible values, enabling the refractive index of the deposited layer to be modulated at will and therefore to obtain layers with low, average or high refractive indexes.

Each solution (1) or (2) containing the metal or metalloid molecular precursor(s) obtained in this manner is deposited on a support to give each time a metal or metalloid oxyhydroxide polymeric layer By the general term "support" is meant any organic or inorganic substrate such as those which will be described below or any active adhesion-promoting layer deposited on said substrate. It is evident for persons skilled in the art that if the layer is not the first to be deposited, it is deposited on a support made up of the substrate and of the layer or layers already deposited.

In the remainder of this disclosure, the term "organic substrate" denotes more precisely a plastic substrate, for example one of those chosen from among polyacrylates, polycarbonates, polyallylcarbonates and polyamides. However, this list is not restrictive and more generally covers organic polymer materials.

The term "inorganic substrate" covers more precisely a mineral substrate, that is to say amorphous materials or even crystalline materials for example, in particular silica, borosilicate or lime-soda glass, fluorophosphates and phosphates.

Compared with mineral substrates, plastic substrates are above all less costly, can be more easily modulated, are lighter and more shock resistant. However their use preferably requires the presence of a layer inserted between the organic substrate and the first deposited layer, to confer proper compatibility on this interface during the densification stage and in particular absorption of induced stresses. According to the invention, this interface layer, or varnish, is preferably chosen from among organosilane polymers, possibly containing mineral colloids.

Generally the substrate is a flat substrate or a substrate having a slight curve, for example the surface of a cathoderay tube screen for television sets or a spectacle lens, but with the method of the invention it is possible to coat any substrate irrespective of its shape.

Depositing of the layers is made for example by dipcoating, by spin coating, by laminar flow coating, tape casting or any other method with which it is possible to obtain a uniform deposit and a layer of homogenous thickness.

On the substrate, according to the method of the invention, the prepared optic material comprises at least two layers of inorganic polymeric material containing a metal oxide or metalloid oxide.

Several particular examples of embodiment of these optic materials prepared using the method of the invention are described below.

However, with the method of the invention it is possible, more extensively, to prepare any optic material comprising at least two layers of inorganic polymeric material containing a metal oxide or metalloid oxide, and all possible combinations of optic layers irrespective of their number or type.

It has already been mentioned that, depending upon the nature of the optic layers, their thickness and their layout in relation to each other, it is possible for example to obtain antireflective or reflective materials.

Generally the thickness of so-called "thin layers" ranges from 0.1 to a few $\mu m$, for example from 0.1 to 10 $\mu m$, and the number of these layers ranges from 2 up to about ten, for example from 2 to 10.

According to the first embodiment of the method of the invention, it is possibly firstly to conduct deposition of the layers and subsequently to proceed with cross-linking/densification by exposure to ultraviolet rays of all the deposited layers.

This treatment is conducted under a UV lamp, for example a mercury vapour lamp or an excimer lamp, which preferably emits in the UV-B and UV-C domain, that is to say a wavelength of 180 to 280 nm.

The UV dose received by the layer must be sufficient to induce cross-linking.

The time of UV exposure is relative to the emitting power of the lamp in the domain of the above-mentioned wavelength.

Generally, this exposure is conducted at an energy of 5 to 10 J/cm$^2$, preferably at an energy of 5 to 6 J/cm$^2$ for a period of 10 sec to 10 min., preferably from 30 sec. to 5 min., for example 1 minute, that is to say a power in the region of 350 mW/cm$^2$ for example. Preferably the operation is conducted at full power.

UV densification/cross-linking may possibly be associated with heat treatment or final annealing at a temperature of 80 to 200° C. for example, preferably from 100 to 150° C., for 10 to 60 minutes, preferably from 15 to 30 minutes, for example at 150° C. for 30 minutes, said treatment enabling densification of the deposited layers to be brought to perfection, even though it is fully satisfactory without this final annealing treatment.

According to a second embodiment of the method of the invention, cross-linking/densification is conducted by exposure to ultraviolet rays after the deposition of each of the layers of inorganic polymeric material, generally under the same conditions as those described above.

It is to be noted that the parameters used for UV exposure may vary in relation to the type of deposited layers; with a low index layer for example containing polymeric SiO$_2$, exposure is conducted with reduced energy and/or time corresponding to an exposure power of approximately 250 to 300 mW/cm$^2$.

In the same manner, heat treatment or final annealing may be carried out under the same conditions as those indicated above after deposition and cross-linking of the layers.

After the last UV exposure treatment, that is to say after UV exposure treatment of the last layer, or treatment by UV exposure of the assembly of layers, prior to optional annealing treatment, and even though the resistance against chemical and mechanical attack of the optic material prepared using the method of the invention is already excellent, it is advantageously possible according to the invention—in order to reinforce the chemical and mechanical properties of the optic stack—to apply a thin hydrophobic anti-abrasive film having a low friction coefficient to protect the last layer applied, which may for example be a layer with a low refractive index.

The use of a hydrophobic agent such as Teflon® is not satisfactory since, between the protective layer and an upper layer in polymeric silica in particular, the interactions are weak making the assembly little resistant to abrasion.

Fluoride silane compounds offer the advantage of forming a chemical bond as they contain groups able to react with the hydroxyl groups located on the surface of the last layer, for example containing polymeric silica, and since they have a long fluoride chain ensuring the hydrophobic nature and low friction coefficient of the deposit.

Among existing products the choice made was $C_6F_{13}CH_2CH_2$—$Si(Oet)_3$((Tridecafluoro-1,2,2,2-tetrahydrooctyl)-1-triethoxysilane), known under the name T2494 and available from ABCR, or $C_6F_{13}CH_2CH_2$—$SiCl_3$ ((Tridecafluoro-1,1,2,2-tetrahydro-octyl)-1-trichlorosilane known under the name T2492 and available from ABCR.

These derivatives have a low refractive index, close to 1.4, and are soluble in some perfluoride compounds, such as GALDEN HT110® produced by MONTEDISON.

Consequently, the "T2494" polymeric silica system obtained for example, is inert to strong acids and strong bases and to usual organic solvents. The layer is perfectly hydrophobic and is scarcely ethanol-wettable. It resists the "severe" test of military standard US-MIL-C-0675C and can be very easily cleaned.

Owing to its very narrow thickness (a few nanometers for example, that is to say about ten nm in particular) the hydrophobic layer does not disturb the optic properties of the last deposited layer, in particular the low index layer, for example the polymeric silica layer.

The method of the invention will now be described in the particular case of preparing a triple-layer antireflective material with cross-linking/densification treatment by exposure of each of the deposited layers to ultraviolet rays In advantageous, but optional, manner scrupulous cleaning-stripping of the substrate is first carried out for example using a solution of hydrofluoric acid diluted to 1%, then the substrate is thoroughly rinsed in deionized water. It is then cleaned with optic soap, rinsed again with distilled water and ethanol dried.

The time required for said cleaning stage is for example approximately 5 minutes.

The following stage consists of applying the layer having an average refractive index to the cleaned substrate, by applying a precursor solution for example to give a $Ta_2O_5$—$SiO_2$ layer, in particular a $TaCl_5$—$Si(OEt)_4$/EtOH solution, for example, in the respective proportion of 80/20 by oxide.

This layer is uniformly applied to the substrate, for example either by dip-coating or by spin coating, at a speed of approximately 10 cm/min at approximately 1000 r/min, or by laminar flow coating. The two latter methods are preferable as they only require very little treatment solution. However, other depositing techniques may also be used. This type of solution depositing has the advantage of allowing relatively large surfaces to be coated with very pure treatment solutions of low viscosity.

A subsequent, optional, stage (that is to say this stage may be omitted) is the densification/cross-linking of this layer by exposure to UV rays, for example to B or C UV rays, preferably at an energy of 5 to 6 J/cm$^2$ for a time of 1 minute (that is to say using power in the region of 350 mW/cm$^2$ for the same time period). Preferably, the operation is conducted using full power.

After cooling the substrate, which only takes 1 to 5 minutes, with the assistance, for example, of a pressurized airstream, the high index layer containing $Ta_2O_5$, which may be prepared from any of the $Ta_2O_5$ precursor solutions (1,2) described above, is deposited and densification/cross-linking of this layer is then optionally conducted by exposure to ultraviolet rays under the same conditions as for the average index layer.

Depositing of the low index layer is then performed, for example in polymeric SiO$_2$, using a suitable treatment solution, for example one of the treatment solutions already mentioned above, that is to say an ethanol solution of polymeric silica obtained from $Si(OEt)_4$ in an HCl or HNO$_3$ medium, or a solution such as $[SiO_2]$=2.4% $[H_2O/Si]_{mol}$=12 and pH≈2, in an HCl or HNO$_3$ medium, which is called "oligomeric silica". It is recalled that, according to the invention, the solutions do not undergo any photo-irradiation, in particular to UV.

The densification/cross-linking stage of this layer is then carried out by UV exposure, but the low refractive index layer is exposed for a shorter time, for example 30 seconds at an energy of approximately 6 J/cm$^2$, since the UV effects on the densification of this layer are more limited than for layers having average of high refractive indexes.

Advantage is taken of the heated coating surface to conduct hot application of a hydrophobic agent such as "T2494" in the manner already described.

The assembly comprising the substrate and three applied layers is then preferably submitted to heat treatment or annealing treatment, at a temperature of 80 to 200° C. for example, preferably 100 to 150° C. for 10 to 60 minutes, preferably 15 to 30 minutes, for example at 150° C. for 30 minutes, in order to bring to perfection the densification of the three layers.

The antireflective coating obtained has excellent optic, mechanical and abrasion-resistant properties.

The total operating time need for the method is, for example, approximately one hour.

The method of the invention for manually preparing said antireflective coating with cross-linking/densification by exposure to ultraviolet rays is particularly well suited to the treatment of an organic substrate, in plastic for example which cannot withstand the high temperature of heat treatments.

With said method it is also possible to produce wide band, abrasion-resistant, antireflective coatings on cathode-ray tube screens in particular, which meet all the requirements cited above. UV densification brings a notable reduction in the production time for triple-layer coatings, by reducing the number of heat treatments, for example at 150° C., from 4 to 1, the thermal inertia of the voluminous substrate virtually trebling treatment times.

Also, by making the surfaces wettable just after exposure, UV densification abolishes the stages of intermediate cleaning, ensures proper interaction between the layers, and improves the mechanical resistance to abrasion of the coating, in particular if the layer of polymeric silica is derived from the "oligomeric silica" preparation.

Finally, the heating of the surface caused by UV exposure, enables the hydrophobic agent to be heat deposited before the single heat treatment that is finally undergone by the triple layer, and therefore reinforces the mechanical resistance of the coating at little cost; this densification method therefore appears relatively more simple to set in operation at industrial level than a series of heat treatments.

The method of the invention will now be described in the particular case of preparing a wide spectrum band reflective material comprising a substrate of organic or inorganic type, on which is deposited at least one assembly of two layers, for example two assemblies of two layers, namely:

one layer with a low refractive index; and
one layer with a high refractive index The substrate and layers having a low refractive index and a high refractive index are identical to those described in the embodiment of antireflective material.

Advantageously, but optionally, the substrate of organic or inorganic type if first subjected to scrupulous cleaning such as described for the production of antireflective material.

On the cleaned substrate a first low refractive index layer is deposited using one of the solution depositing techniques already cited. The solvent being advantageously chosen from among the aliphatic alcohols.

Cross-linking of this layer is then carried out under UV and under the conditions already mentioned for the antireflective coating.

This is followed by deposition of the high refractive index layer, and UV densification is again conducted.

The above-mentioned depositing operations are repeated as many times as is necessary to obtain the desired reflectivity.

The assembly stack may optionally be submitted to baking or annealing under conditions similar to those used for the antireflective coating.

The coating resistance can be further improved by subsequent depositing of a hydrophobic antiabrasive layer, similar to that already described above for the antireflective material, and which terminates the stack, this layer being applied under heat in the same manner as for the antireflective material, by spraying for example.

The invention is described below with reference to the following examples which are given for illustration purposes and are in no way restrictive.

EXAMPLE 1

This example illustrates the preparation of a bilayer optic material comprising a high index layer in $Ta_2O_5$ and a low index layer in $SiO_2$, according to the first embodiment of the method of the invention, that is to say with final cross-linking/densification of all the layers by exposure to ultraviolet rays.

Firstly a high index layer in $Ta_2O_5$ is prepared by making the deposit with three types of treatment solutions:

$TaCl_5$/EtOH (7.0% by oxide mass), $TaCl_2(OEt)_3$/EtOH (at 6.5%) and $TaCl_2(OEt)_3$/EtOH—$NH_3$ (at 7.6%).

The rotating speeds for the substrate are respectively set at 1200, 1000 and 1700 revolutions $min^{-1}$.

After drying for two minutes, the deposited layers have an index of 1.601, 1.639 and 1.616 respectively, and each have a thickness of 167, 141 and 163 nm. The maximum reflection peaks (quarterwave peak) are situated at 1070, 925 and 1053 nm respectively before densification.

The low index layer in $SiO_2$ is then prepared by placing the deposit on the substrate coated with the first layer in $Ta_2O_5$, using four types of treatment solutions:

polymeric $SiO_2$ in HCl medium prepared from a mother solution having a $SiO_2$ concentration of 10.6 %, a $[H_2O]/[SiO_2]$ molar ratio of 10, a pH close to 2, matured for one month, and diluted until a $SiO_2$ concentration of 3.75% is obtained;

polymeric $SiO_2$ in $HNO_3$ medium, prepared under the same conditions as above; and $SiO_2$ prepared under the conditions described by S. MAEKAWA and T. OHISHI in J. of Non-crystalline Solids, 169, 1994, p.207 ($[SiO_2]$=2.4%, $[H_2O]/[SiO_2]$=12 and pH≈2, stirring overnight, but without exposing the solution to UV contrary to the publication).

It is to be noted that use of $SiO_2$ prepared from a mixture of tetraethoxysilane in an ethanol medium with an HCl acid catalysis solution such that $[SIO_2]$=2.4 %, $[H_2O]/[SiO_2]$=12 and pH≈2, after stirring overnight, again without UV exposure, is equivalent to the preceding preparation.

The last two preparations are called "oligomeric silica".

The rotating speeds used for the substrate are 3400, 3700 and 1000 $r/min^{-1}$ respectively. After drying for two minutes, the deposited layers have an index of 1.393, 1.394 and 1.409 respectively and their respective thickness is 128, 133 and 123 nm. The minimum reflection peaks (quarterwave peak) are situated at 715, 740 and 691 nm respectively, before densification.

The bi-layer produced in this manner is densified under UV at full power (that is to say with a power of 350 $mW/cm^2$).

Advantage is taken of the heated surface at approximately 80° C. to heat deposit a hydrophobic agent by spraying.

The stack assembly is subjected to heat treatment at 150° C. for 30 minutes in order to perfect densification of the two layers.

The total operating time for the method for a strip 80 mm in diameter is about half an hour.

The best results are obtained with the SiO$_2$ solution of oligomeric type, with which the bi-layer coating, coated with the T2494 hydrophobic agent, can practically resist the "severe" abrasion test for standard US-MIL-C-0675C under which it only suffers slight rub marks on the antireflective surface.

By comparison, tests with polymeric SiO$_2$ layers in an HCl or HNO$_3$ medium yield coatings that are slightly less resistant to abrasion, the mechanical properties being comparable with those obtained by a manufacturing process which solely makes use of heat treatments as means of densification.

In respect of the oligomeric SiO$_2$ solution, the precursor, coupled with UV action, can enable a strong interaction to be set up between the silica layer and the high index Ta$_2$O$_5$ layer, thereby guaranteeing good mechanical resistance.

The UV exposure dose appears to play an important part, since when it decreases at the Ta$_2$O$_5$ and SiO$_2$ containing layers, the abrasion resistance of the coating may be affected.

Also, UV exposure of the T2494 hydrophobic layer does not improve the mechanical properties of the bi-layer.

EXAMPLE 2

This example illustrates the second embodiment of the method of the invention.

That is to say it describes the preparation of an antireflective optic material made up of a triple layer stack, with UV exposure of each of the deposited layers.

The treatment solutions used are the following: TaCl$_5$—Si(OEt)$_4$/EtOH for the average index layer, TaCl$_2$(OEt)$_3$/EtOH—NH$_3$ for the high index layer, polymeric SiO$_2$ in HCl, polymeric SiO$_2$ in HNO$_3$ or oligomeric SiO$_2$ for the low index layer. A substrate in silicate glass with a diameter of 80 mm is first scrupulously cleaned, then on this cleaned substrate an average index layer Ta$_2$O$_5$—SiO$_2$ (80/20) is deposited and densified under UV at full power (that is to say at a power of 350 mW/cm$^2$), then the substrate is cooled for about 3 minutes with the aid of a pressurized air stream, after which the high index layer in Ta$_2$O$_5$ is deposited and densified under UV under the same conditions. Next the low index SiO$_2$ layer is deposited which is exposed to UV with a dose in the region of 250 mW/cm$^2$.

Advantage is taken of the heated coating surface at approximately 80° C. to heat deposit a hydrophobic agent by spraying. The stack assembly is submitted to heat treatment at 150° C. for 30 minutes in order to perfect the densification of the three layers. The total operating time for the method for a strip 80 mm in diameter is approximately one hour.

The best results are obtained with the SiO$_2$ solution of oligomeric type, with which the triple layer, coated with the T2494 hydrophobic agent, practically resists the "severe" abrasion test for standard US-MIL-C-0675C and only suffers slight discoloration of the antireflective surface.

In comparison, tests with the layers of polymeric SiO$_2$ in HCl or HNO$_3$ medium show slightly less abrasion resistance, the mechanical properties being comparable with those obtained using a manufacturing process which makes sole use of heat treatments for densification. For the oligomeric SiO$_2$ solution, the precursor, when coupled with UV action, can enable a strong interaction to be set up between the silica layer and the high index Ta$_2$O$_5$ layer, thereby guaranteeing good mechanical resistance.

The UV exposure dose appears to play an important part since when it decreases at the Ta$_2$O$_5$ and SiO$_2$ containing layers, the abrasion resistance of the coating may be affected. Also, UV exposure of the T2494 hydrophobic agent layer does not improve the mechanical properties of the triple layer.

What is claimed is:

1. Method for preparing an optic material by depositing on a substrate at least two layers of inorganic polymeric material, containing at least one metal oxide or metalloid oxide, characterized in that the layers are deposited from precursor solution(s) which have not undergone photo-irradiation, and in that the deposited layers are densified/cross-linked at ambient temperature by exposure to ultraviolet rays.

2. Method in accordance with claim 1 characterized in that said metal oxide or metalloid oxide is chosen from among tantalum oxide, titanium oxide, yttrium oxide, scandium oxide, zirconium oxide, hafnium oxide, thorium oxide, niobium oxide, lanthanum oxide, aluminum oxide, silicon oxide and magnesium oxide.

3. Method in accordance with claim 1, characterized in that cross-linking/densification by exposure to ultraviolet rays is conducted after depositing each of the layers of inorganic polymeric material.

4. Method in accordance with claim 1, characterized in that cross-linking/densification by exposure to ultraviolet rays is conducted on the assembly of deposited layers.

5. Method in accordance with claim 1, characterized in that said exposure to ultraviolet rays is conducted using an energy of 5 to 10 J/cm$^2$ for a period of 10 sec to 10 min.

6. Method in accordance with claim 1, characterized in that on completion of densifying/cross-linking by exposure to ultraviolet rays, heat treatment or final annealing is carried out.

7. Method in accordance with claim 6, characterized in that the heat treatment or final annealing is conducted at a temperature of 80 to 200° C. for 10 to 60 minutes.

8. Method in accordance with claim 1, characterized in that each layer of inorganic polymeric material containing at least one metal oxide or metalloid oxide is prepared and deposited by the stages consisting of:

preparing a solution (1) in a solvent (3) comprising a molecular compound containing a metal or metalloid, also called a metal or metalloid molecular precursor;

optionally, mixing said solution (1) with one or more solutions in a solvent of same type comprising one or more metal or metalloid compounds whose metal or metalloid is different to the metal or metalloid of the metal or metalloid compound of solution (1); or adding said metal or metalloid compound(s) to said solution (1); after which a solution (2) is obtained;

depositing solution (1) or (2) that is obtained on a support to form a uniform layer of polymeric material.

9. Method in accordance with claim 8, characterized in that the solvent or solvents is (are) chosen from among the saturated aliphatic alcohols with the formula ROH, in which R represents an alkyl group with 1 to 5 carbon atoms.

10. Method in accordance with claim 8, characterized in that the said precursor(s) is (are) chosen from among alkoxides, halides and other metal or metalloid salts.

11. Method in accordance with claim 8, characterized in that said precursor is chosen from among pentahalides of tantalum TaX$_5$ where X=F, Br, I, Cl.

12. Method in accordance with claim 1, characterized in that after the last treatment by ultraviolet exposure, an antiabrasive layer containing a fluoride silane is deposited.

13. Method in accordance with claim 1, characterized in that at least one of the deposited layers is a layer of polymeric material having a high refractive index.

14. Method in accordance with claim 13, characterized in that at least one other deposited layer is chosen in addition from among:

a densified/cross-linked polymeric layer having a low refractive index, a densified/cross-linked polymeric layer having an average refractive index, an antiabrasive layer containing a fluoride silane.

15. Method in accordance with claim 14 for preparing an optic material having wide spectral band antireflective properties, characterized in that it successively entails depositing on a substrate of organic or inorganic type:

a layer with an average refractive index, a layer with a high refractive index, a layer with a low refractive index, optionally, an antiabrasive layer.

16. Method in accordance with claim 15 for preparing a wide spectral band antireflective material, characterized in that it comprises the following stages:

cleaning-stripping of the substrate;

depositing on the cleaned substrate the layer having an average refractive index;

densifying/cross-linking the deposited layer having an average refractive index by exposure to ultraviolet rays;

depositing the layer with a high refractive index;

densifying/cross-linking the deposited layer having a high refractive index by exposure to ultraviolet rays;

depositing the layer having a low refractive index;

densifying/cross-linking the deposited low refractive index layer by exposure to ultraviolet rays;

applying the antiabrasive layer to the low index layer;

heat treatment of the assembly of applied layers and the substrate.

17. Method in accordance with claim 15, characterized in that the layer with an average refractive index is formed of a polymeric material containing tantalum oxide and silicon oxide or magnesium oxide, the relative proportions in tantalum oxide and silicon oxide or magnesium oxide equivalent, $Ta_2O_5/SiO_2$ or $Ta_2O_5/MgO$, being variable from 0/100 to 100/0, subsequent to which the refractive index of the polymeric layer obtained can be modulated at will.

18. Method in accordance with claim 15, characterized in that the layer with a low refractive index is a layer formed of polymeric silica chosen from among polymeric silica prepared in HCl medium, polymeric silica prepared in $HNO_3$ medium and oligomeric silica.

19. Optic process in accordance with claim 15, characterized in that the antiabrasive later is formed from $C_6F_{13}$—$CH_2CH_2$—$Si(OEt)_3$ or from $C_6F_{13}$—$CH_2CH_2$—$SiCl_3$.

20. Method in accordance with claim 14 for preparing an optic materials having narrow spectral band antireflective properties, characterized in that it successively entails depositing on a substrate of inorganic or organic type:

a layer with high refractive index;

a layer with a low refractive index;

optionally, an antiabrasive layer.

21. Method in accordance with claim 20, characterized in that the layer with an average refractive index is formed of a polymeric material containing tantalum oxide and silicon oxide or magnesium oxide, the relative proportions in tantalum oxide and silicon oxide or magnesium oxide equivalent, $Ta_2O_5/SiO_2$ or $Ta_2O_5/MgO$, being variable from 0/100 to 100/0, subsequent to which the refractive index of the polymeric layer obtained can be modulated at will.

22. Method in accordance with claim 20, characterized in that the layer with a low refractive index is a layer formed of polymeric silica chosen from among polymeric silica prepared in HCl medium, polymeric silica prepared in $HNO_3$ medium and oligomeric silica.

23. Optic process in accordance with claim 20, characterized in that the antiabrasive later is formed from $C_6F_{13}$—$CH_2CH_2$—$Si(OEt)_3$ or from $C_6F_{13}$—$CH_2CH_2$—$SiCl_3$.

24. Method in accordance with claim 14 for preparing an optic material having reflective properties, characterized in that is successively entails depositing on a substrate or organic or inorganic type at least one sequence of two layers comprising:

a layer with a low refractive index;

a layer with a high refractive index;

optionally, an antiabrasive layer.

25. Method in accordance with claim 24, characterized in that the layer with an average refractive index is formed of a polymeric material containing tantalum oxide and silicon oxide or magnesium oxide, the relative proportions in tantalum oxide and silicon oxide or magnesium oxide equivalent, $Ta_2O_5/SiO_2$ or $Ta_2O_5/MgO$, being variable from 0/100 to 100/0, subsequent to which the refractive index of the polymeric layer obtained can be modulated at will.

26. Method in accordance with claim 24, characterized in that the layer with a low refractive index is a layer formed of polymeric silica chosen from among polymeric silica prepared in HCl medium, polymeric silica prepared in $HNO_3$ medium and oligomeric silica.

27. Optic process in accordance with claim 24, characterized in that the antiabrasive later is formed from $C_6F_{13}$—$CH_2CH_2$—$Si(OEt)_3$ or from $C_6F_{13}$—$CH_2CH_2$—$SiCl_3$.

28. Method in accordance with claim 14, characterized in that the layer with an average refractive index is formed of a polymeric material containing tantalum oxide and silicon oxide or magnesium oxide, the relative proportions in tantalum oxide and silicon oxide or magnesium oxide equivalent, $Ta_2O_5/SiO_2$ or $Ta_2O_5/MgO$, being variable from 0/100 to 100/0, subsequent to which the refractive index of the polymeric layer obtained can be modulated at will.

29. Method in accordance with claim 14, characterized in that the layer with a low refractive index is a layer formed of polymeric silica chosen from among polymeric silica prepared in HCl medium, polymeric silica prepared in $HNO_3$ medium and oligomeric silica.

30. Optic process in accordance with claim 14, characterized in that the antiabrasive later is formed from $C_6F_{13}$—$CH_2CH_2$—$Si(OEt)_3$ or from $C_6F_{13}$—$CH_2CH_2$—$SiCl_3$.

31. Method in accordance with claim 13, characterized in that the layer with a high refractive index is a polymeric layer containing tantalum oxide.

* * * * *